(12) United States Patent
Chung et al.

(10) Patent No.: US 7,856,356 B2
(45) Date of Patent: Dec. 21, 2010

(54) SPEECH RECOGNITION SYSTEM FOR MOBILE TERMINAL

(75) Inventors: Hoon Chung, Daejeon (KR); Yunkeun Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1033 days.

(21) Appl. No.: 11/642,132

(22) Filed: Dec. 20, 2006

(65) Prior Publication Data

US 2008/0059185 A1    Mar. 6, 2008

(30) Foreign Application Priority Data

Aug. 25, 2006    (KR)    .................... 10-2006-0081027

(51) Int. Cl.
 *G10L 15/14*    (2006.01)
(52) U.S. Cl. .................... 704/256; 704/251; 704/231; 704/256.4; 704/256.5
(58) Field of Classification Search ............... 704/256, 704/251, 231, 256.4, 256.5
 See application file for complete search history.

(56) References Cited

U.S. PATENT DOCUMENTS

| | | | | |
|---|---|---|---|---|
| 5,625,749 | A | * | 4/1997 | Goldenthal et al. ......... 704/254 |
| 5,822,729 | A | * | 10/1998 | Glass ......................... 704/255 |
| 5,937,384 | A | * | 8/1999 | Huang et al. ................ 704/256 |
| 7,447,635 | B1 | * | 11/2008 | Konopka et al. ............ 704/275 |
| 2005/0075143 | A1 | | 4/2005 | Choi |
| 2006/0004721 | A1 | | 1/2006 | Bedworth et al. |

FOREIGN PATENT DOCUMENTS

| | | |
|---|---|---|
| KR | 1020010004468 | 1/2001 |
| KR | 10-2003-0097347 | 12/2003 |
| KR | 2004-0061070 | 7/2004 |
| KR | 2004-0076035 | 8/2004 |
| KR | 1020050033248 | 5/2005 |

OTHER PUBLICATIONS

Scharenborg, O., "Parallels between HSR and ASR: How ASR can Contribute to HSR." 2005. Interspeech 2005, pp. 1237-1240.
Bosch, L., et al., "ASR Decoding in a Computation Model of Human Word Recognition." 2005. Interspeech 2005. pp. 1241-1244.

* cited by examiner

*Primary Examiner*—Qi Han
(74) *Attorney, Agent, or Firm*—Ladas & Parry LLP

(57) ABSTRACT

A speech recognition system for a mobile terminal includes an acoustic variation channel unit and a pronunciation channel unit. The acoustic variation channel unit transforms a speech signal into feature parameters and Viterbi-decodes the speech signal to produce a varied phoneme sequence by using the feature parameters and predetermined models. Further, the pronunciation variation channel unit Viterbi-decodes the varied phoneme sequence to produce a word phoneme sequence by using the varied phoneme sequence and a preset DHMM (Discrete Hidden Markov Model) based context-dependent error model.

18 Claims, 9 Drawing Sheets

```
for(each frame)
{
        for(activated phoneme node )
        {
                get accumulated likelihood ;
        }
        get pruning threshold ;
        for ( activated phoneme node )
        {
                if (accumulated likelihood score < pruning threshold )
                {
                        unload phoneme node ;
                }
        }
        for (activated phoneme node )
        {
                if (reach to the final stste )
                {
                        if (any following phoneme node )
                        {
                                load ARC information ;
                                load phoneme node ;
                        }
                }
        }
}
```

SPEECH RECOGNITION SYSTEM FOR MOBILE TERMINAL

FIELD OF THE INVENTION

The present invention relates to a speech recognition system for a mobile terminal; and, more particularly, to a system for recognizing large vocabulary quickly in a mobile terminal having a limited amount of system resources by separately decoding two noisy channels which together form a two-stage noisy channel, on the assumption that a speech is uttered via the two-stage noisy channel; and for minimizing a memory usage by loading only a part necessary for operations into a memory with a dynamic loading method which predicts the necessary part from an entire search space for the large vocabulary.

BACKGROUND OF THE INVENTION

Figure 1:
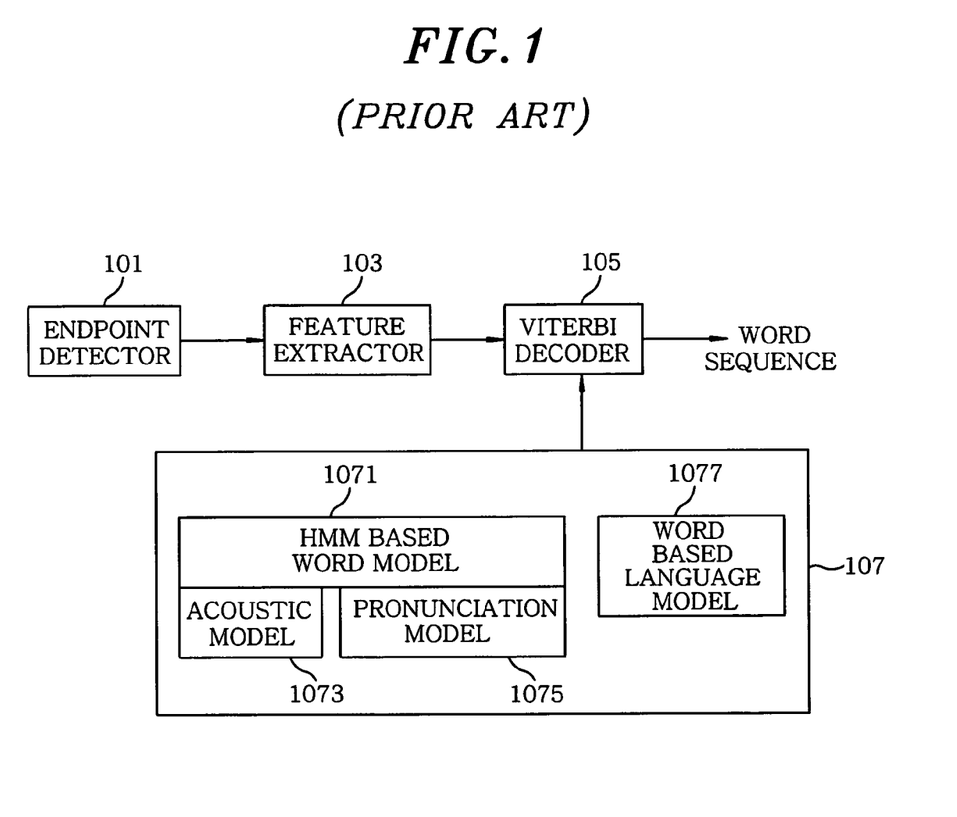
FIG. 1 shows a conventional HMM based one-pass speech recognition system.

As is generally known, HMM (Hidden Markov Model) based speech recognition is achieved by a system configuration shown in FIG. 1.

FIG. 1 shows a conventional HMM based one-pass speech recognition system, wherein the system includes an endpoint detector 101, a feature extractor 103, a Viterbi decoder 105 and a storage 107.

The endpoint detector 101 accurately detects a speech signal section of an input signal in a varying background noise environment to provide the speech signal section to the feature extractor 103, wherein the speech signal section is detected with a variety of parameters used for dividing a signal into a speech and a non-speech signal section.

The feature extractor 103 transforms the speech signal section received from the endpoint detector 101 into feature parameters suitable for a speech recognition by mainly using an MFCC (Mel-Frequency Cepstrum Coefficient) or a PLPCC (Perceptual Linear Prediction Cepstrum Coefficient) to provide the feature parameters to the Viterbi decoder 105.

The Viterbi decoder 105 finds a path of a word or a word phoneme sequence having a maximum likelihood in a search space, wherein the search space includes a linkage structure of within-vocabulary and words, i.e., an HMM based word model 1071, an acoustic model 1073, a pronunciation model 1075, and a word based language model 1077; and a feature parameter sequence received from the feature extractor 103.

Figure 2:
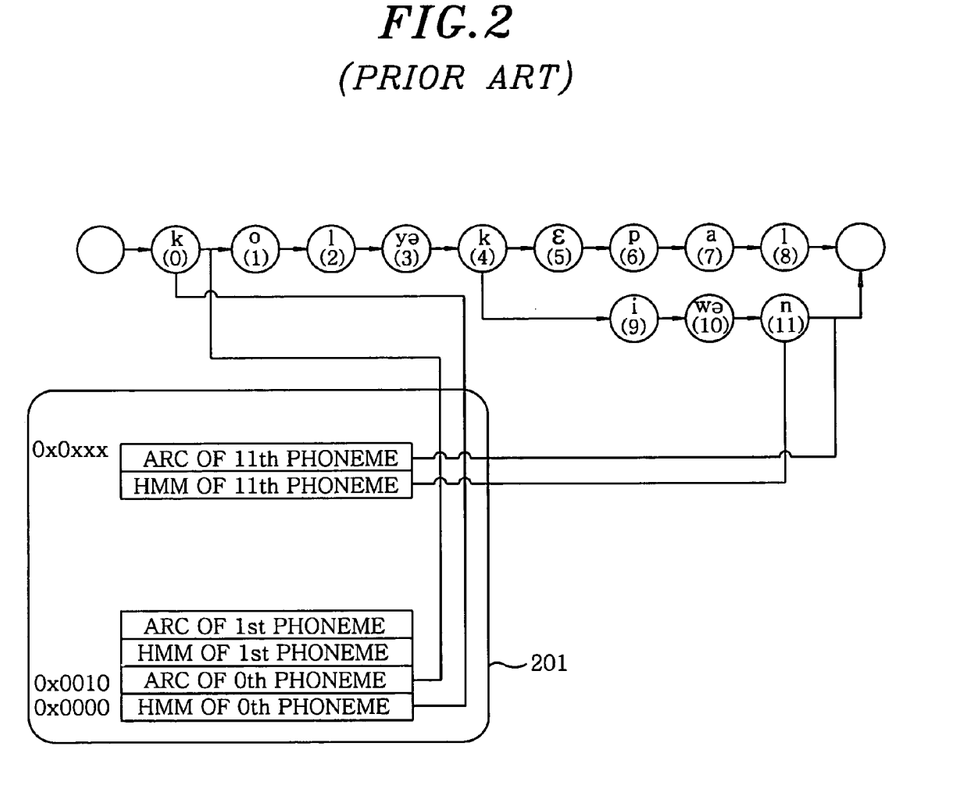
FIG. 2 describes a conventional within-vocabulary model and a memory structure for loading the model.

FIG. 2 describes a conventional within-vocabulary model and a memory structure for loading the model. Referring to FIG. 2, the within-vocabulary model, e.g., having two Korean words "goryeogaebal" and "goryeogiwon", is defined with phoneme nodes in which the phonemes form the words and arcs which represent connection states of the phoneme nodes. Accordingly, in order to load an entire preset within-vocabulary models, a capacity of a memory 201 needs to be the number of total phonemes used for representing within-vocabulary multiplied by the sum of a memory capacity necessary for representing HMM and for defining arcs. Equation 1 is a dynamic program for finding a likelihood of an optimal path in Viterbi-decoding algorithm.

1. Initialization
Equation 1
$$\delta^1(i) = \pi_i \cdot b_i(x_1), \ 1 \le i \le N$$

2. Recursion:
$$\delta^t(j) = \max_i \{\delta^{t-1}(i) \cdot a_{i,j}\} \cdot b_j(x_t),$$
$$1 \le i, j \le N, 2 \le t \le T$$

3. Termination
$$P^* = \operatorname{argmax}_i \{\delta^T(i)\}$$

Wherein, N indicates the number of states of HMM forming within-vocabulary, T represents the number of frames of an input feature vector, $TT_i$ indicates the initial state distribution, and $a_{i,j}$ indicates the transition probabilities.

Further, as shown in Equation 2, an amount of operations necessary for finding an optimal path by searching a search space having a size of multiplication of N and T may be defined as C, which is an amount of computations necessary for the recursion operations of Equation 1.

$$C = \left( N \cdot T - \sum_{n=1}^{N-1} n \right) \cdot C_r$$
Equation 2
$$\approx N \cdot T \cdot C_r$$

Almost all methods relating to a high-speed recognition use a method for reducing only an amount of computations for observation probability operations $b_j(x_t)$ in the recursion operations; or a two-stage search method formed with a fast match and a detailed match.

The fast match of the two-stage search method, however, is not a method for reducing a search space, but for increasing an entire recognition speed by reducing the observation probability operations $b_j(x_t)$. Therefore, the fast match has a drawback that the recognition speed will be drastically decreased if the within-vocabulary increases.

SUMMARY OF THE INVENTION

It is, therefore, an object of the present invention to provide a speech recognition system for a mobile terminal for performing a speech recognition at high speed despite an increase of the within-vocabulary by separately decoding two noisy channels, on the assumption that a speech is uttered via the two separate noisy channels, i.e., an acoustic variation channel and a pronunciation variation channel (on the contrary, a speech had been assumed to be uttered via one noisy channel in conventional speech recognition systems); and for minimizing a memory usage by loading only a part necessary for operations into a memory with a dynamic loading method, which is configured to predict the necessary part from an entire search space for large vocabulary.

In accordance with the present invention, there is provided a speech recognition system for a mobile terminal, the system including:

an acoustic variation channel unit for transforming a speech signal into feature parameters and Viterbi-decoding the speech signal to produce a varied phoneme sequence by using the feature parameters and predetermined models; and a pronunciation variation channel unit for Viterbi-decoding the varied phoneme sequence to produce a word phoneme sequence by using the varied phoneme sequence and a preset DHMM (Discrete Hidden Markov Model) based context-dependent error model.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Hereinafter, preferred embodiments of the present invention will be described in detail with reference to the accompanying drawings.

Figure 3:
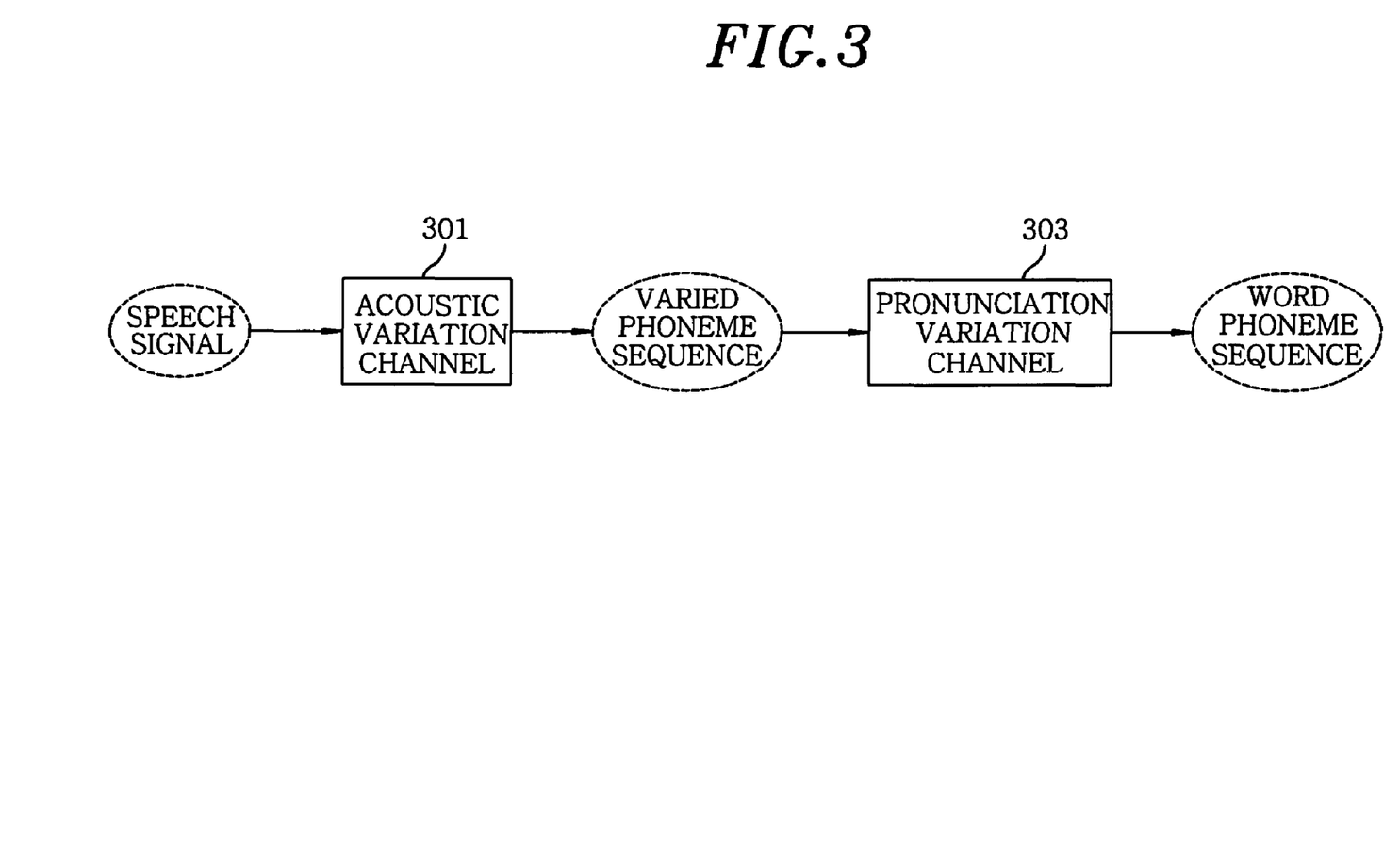
FIG. 3 is a block diagram showing a speech recognition system for a mobile terminal in accordance with the present invention.

FIG. 3 is a block diagram showing a speech recognition system for a mobile terminal in accordance with the present invention, which includes an acoustic variation channel unit 301 and a pronunciation variation channel unit 303 corresponding to two separate noisy channels.

Figure 4:
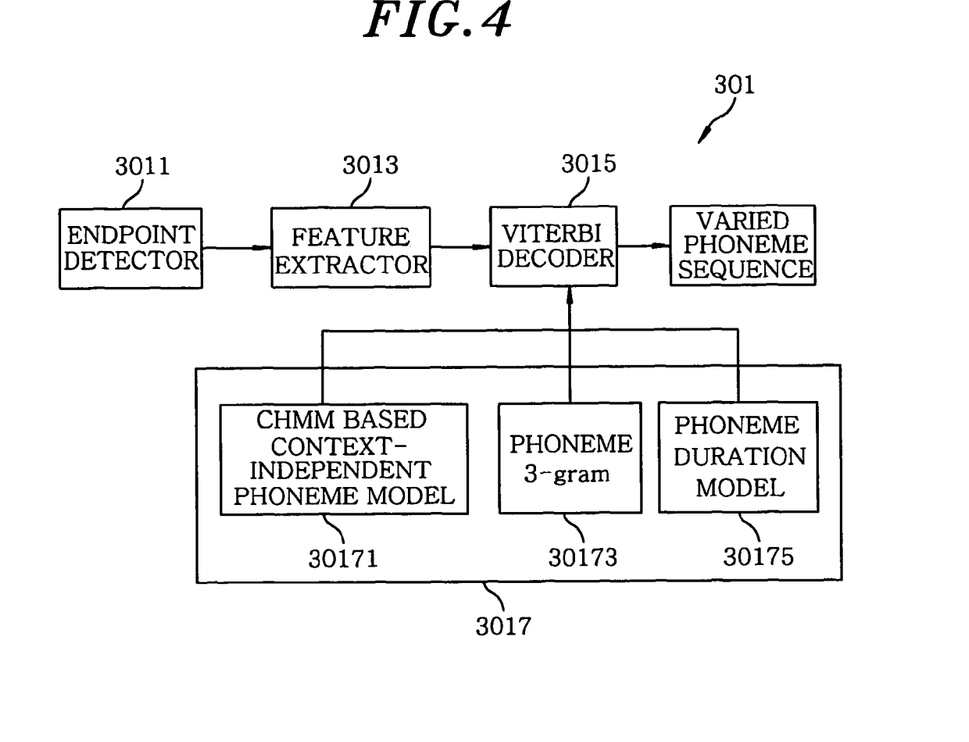
FIG. 4 provides a detailed block diagram showing the acoustic variation channel unit shown in FIG. 3.

The acoustic variation channel unit 301 is a block for reflecting a distortion of each phoneme due to individual pronunciation characteristics of a speaker and background noise during a real utterance of the phoneme. As shown in FIG. 4, the acoustic variation channel unit 301 includes an endpoint detector 3011, a feature extractor 3013, a Viterbi decoder 3015 and a storage 3017.

The endpoint detector 3011 accurately detects a speech signal section of an input signal received from an input device (e.g., a computer, a microphone or the like) in a varying background noise environment to provide the speech signal section to the feature extractor 3013, wherein the speech signal section is detected with a variety of parameters used for dividing a signal into a speech and a non-speech signal section.

The feature extractor 3013 transforms the speech signal section received from the endpoint detector 3011 into feature parameters suitable for speech recognition by mainly using an MFCC or a PLPCC in order to provide the feature parameters to the Viterbi decoder 3015.

The Viterbi decoder 3015 Viterbi-decodes the speech signal into the varied phoneme sequence by using a decoding equation of Equation 3 with corresponding models among preset models (e.g., a CHMM based context-independent phoneme model 30171, phoneme 3-gram 30173 and a phoneme duration model 30175) stored in the storage 3017 and the feature parameters transformed by the feature extractor 3013.

$$T^* = \mathrm{argmax}_T P(T|X) \qquad \text{Equation 3}$$

Wherein X indicates a vector sequence corresponding to the feature parameters of the input speech signal and T represents a phoneme sequence. Accordingly, $\mathrm{arg}_T \mathrm{max} P(T|X)$ indicates a decoding process of the input speech signal received from the input device (e.g., a computer or a microphone) into the phoneme sequence.

In practice, however, since it is impossible to compute a posterior probability like Equation 3, a phoneme sequence which maximizes a multiplication of a prior probability and a conditional probability like Equation 4 is obtained by using Bayes' rule. During this process, three types of error, i.e., an insertion error, a deletion error and a substitution error, may occur. Among the three types of error, the deletion error means a loss of information on a word to be decoded, and if possible, it needs to be decreased because a critical problem could arise during a decoding process of the pronunciation variation channel unit 303. Accordingly, the varied phoneme sequence is obtained by using Equation 5, which is derived from Equation 4 by applying the phoneme duration model to Equation 4, and provided to the pronunciation variation channel unit 303.

$$\begin{aligned} T^* &= \mathrm{argmax}_T P(T|X) \\ &= \mathrm{argmax}_T \frac{P(X|T)P(T)}{P(X)} \\ &\approx \mathrm{argmax}_T P(X|T)P(T) \end{aligned} \qquad \text{Equation 4}$$

$$\begin{aligned} T^* &= \mathrm{argmax}_T P(X|T)P(T) \\ &= \mathrm{argmax}_T P(X|S,T)P(S|T)P(T) \end{aligned} \qquad \text{Equation 5}$$

Wherein P(S|T) is a phoneme duration model serving as a probability that a phoneme will occupy an input frame, which is modeled as a function of a duration and a frequency variation.

Figure 5:
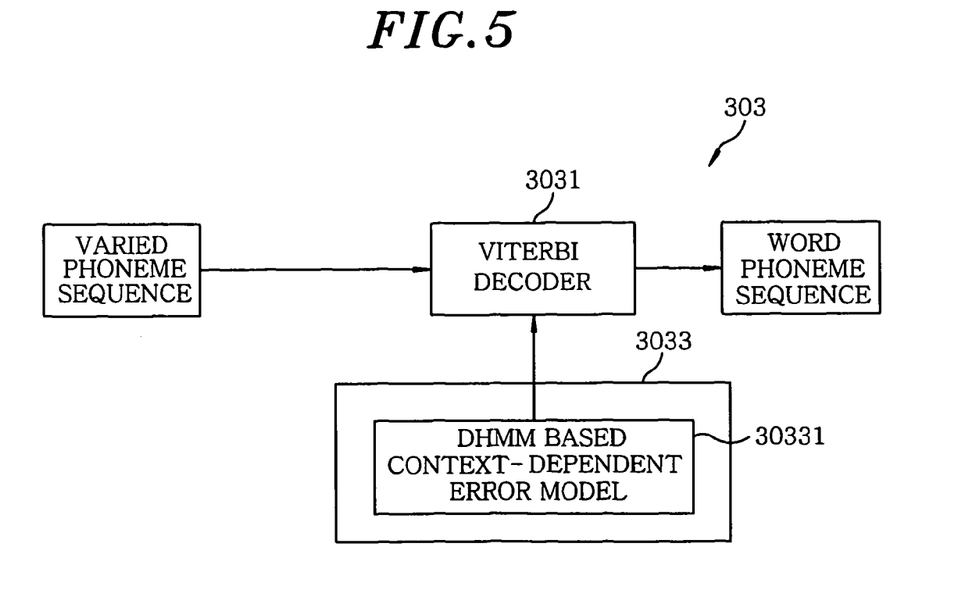
FIG. 5 presents a detailed block diagram showing the pronunciation variation channel unit shown in FIG. 3.

The pronunciation variation channel unit 303 is a block for obtaining a word phoneme sequence by reflecting a variation of a phoneme of a word to be uttered due to regional characteristics or inclinations of a speaker. As shown in FIG. 5, the pronunciation variation channel unit 303 includes a Viterbi decoder 3031 and a storage 3033 for storing a DHMM (Discrete Hidden Markov Model) based context-dependent error model 30331.

The Viterbi decoder 3031 Viterbi-decodes the varied phoneme sequence into the word phoneme sequence by using a decoding equation of Equation 6 with the varied phoneme sequence Viterbi-decoded by the acoustic variation channel unit 301 and the DHMM based context-dependent error model 30331.

$$W^* = \underset{W}{\mathrm{argmax}} P(W|T^*)  \quad \text{Equation 6}$$

Wherein T* indicates the varied phoneme sequence and W represents the word phoneme sequence. Accordingly, $\mathrm{argmax}_W P(W|T^*)$ denotes a decoding process of the varied phoneme sequence received from the acoustic variation channel unit 301 into the word phoneme sequence.

However, since it is impossible to compute a posterior probability like Equation 6, a word phoneme sequence which maximizes a multiplication of a prior probability and a conditional probability like Equation 7 is obtained by using Bayes' rule. During this process, a pronunciation variation model P(T*|W) corresponding to the word model W is required, but this conditional probability is difficult to be deducted in practice. Therefore, on the assumption that errors in all phonemes occur separately by the phoneme, most of the conventional speech recognition methods have used Equation 8 which is an approximate equation of Equation 7 in order to measure likelihoods that variations occur in phoneme sequences that are different from each other by executing a dynamic program referred to as a probabilistic minimum edit distance algorithm.

$$W^* = \underset{W}{\mathrm{argmax}} P(W|T^*)  \quad \text{Equation 7}$$
$$= \underset{W}{\mathrm{argmax}} \frac{P(T^*|W)P(W)}{P(T^*)}$$
$$\approx \underset{W}{\mathrm{argmax}} P(T^*|W)P(W).$$

$$C^* \approx \underset{c}{\mathrm{argmax}} \prod_{i=1}^{N} P(t_i^*|c_i)P(W)  \quad \text{Equation 8}$$

Figure 6:
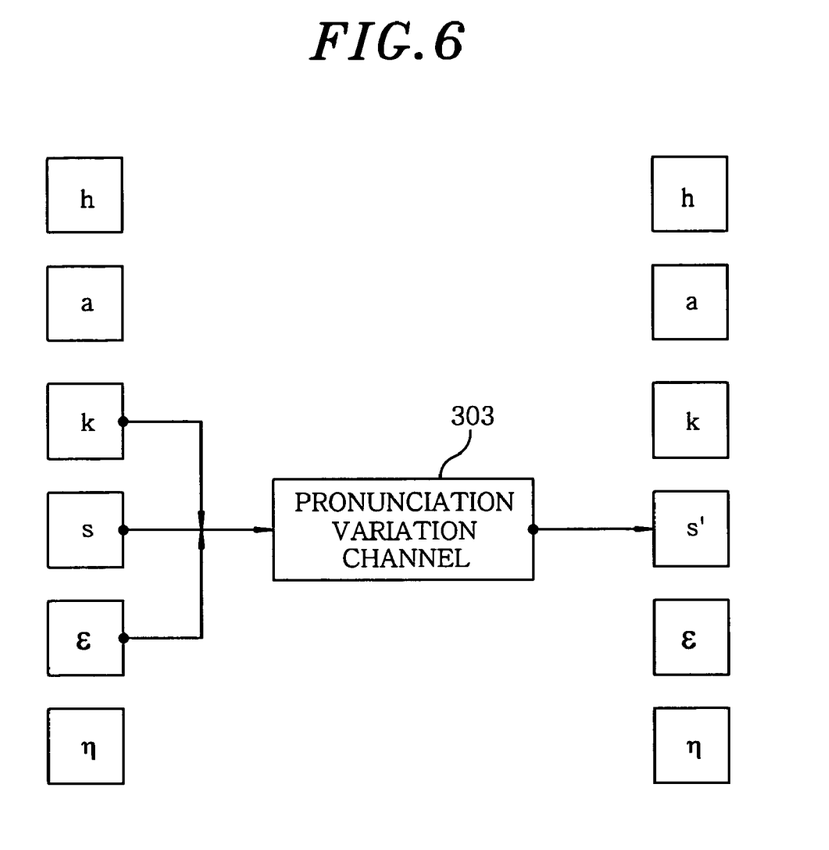
FIG. 6 is an exemplary view showing a context-dependent pronunciation variation model defined by the pronunciation variation channel unit in accordance with the present invention.

In accordance with the present invention, however, a context-dependent pronunciation variation model is used. FIG. 6 is an exemplary view showing a context-dependent pronunciation variation model defined by the pronunciation variation channel unit 303 in accordance with the present invention. Referring to FIG. 6, each word (e.g., a Korean word "haksaeng") is formed with a sequence of phonemes (e.g., 'h', 'a', 'k', 's', 'ϵ' and 'ŋ') and a pronunciation variation $t_i^*$ may occur in each phoneme $c_i$ by an affection of its neighboring phonemes $c_{i-1}$ and $c_{i+1}$ (e.g., the phoneme 's' between 'k' and 'ϵ' is varied into 's'), thereby defining a context-dependent pronunciation variation model like Equation 9.

$$W^* = \underset{W}{\mathrm{argmax}} P(T^*|W)P(W)  \quad \text{Equation 9}$$
$$= \underset{W}{\mathrm{argmax}} P(t_N^*, K, t_2^*, t_1^*|c_N, K, c_2, c_1)P(W)$$
$$\approx \underset{c}{\mathrm{argmax}} \prod_{i=1}^{N} P(t_i^*|c_{i+1}, c_i, c_{i-1})P(W)$$

Figure 7:
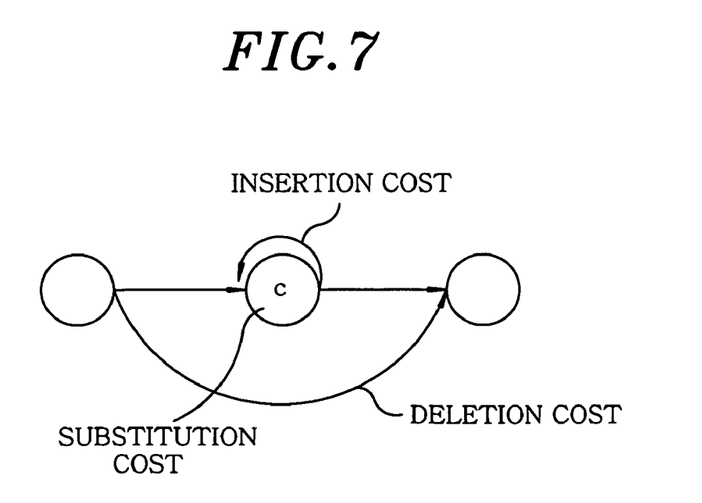
FIG. 7 illustrates a topology of DHMM for modeling a context-dependent phoneme in accordance with the present invention.

Further, the number of phonemes of the varied phoneme sequence serving as an output of the acoustic variation channel unit 301 may differ from the number of phonemes forming a word, so that the context-dependent pronunciation variation model $P(t_i^*|c_{i+1}, c_i, c_{i-1})$ in Equation 9 is modeled with the DHMM based context-dependent error model 30331 having three types of errors (e.g., an insertion cost, a deletion cost and a substitution cost). The topology of the DHMM is shown as a state transition diagram in FIG. 7.

Figure 8:
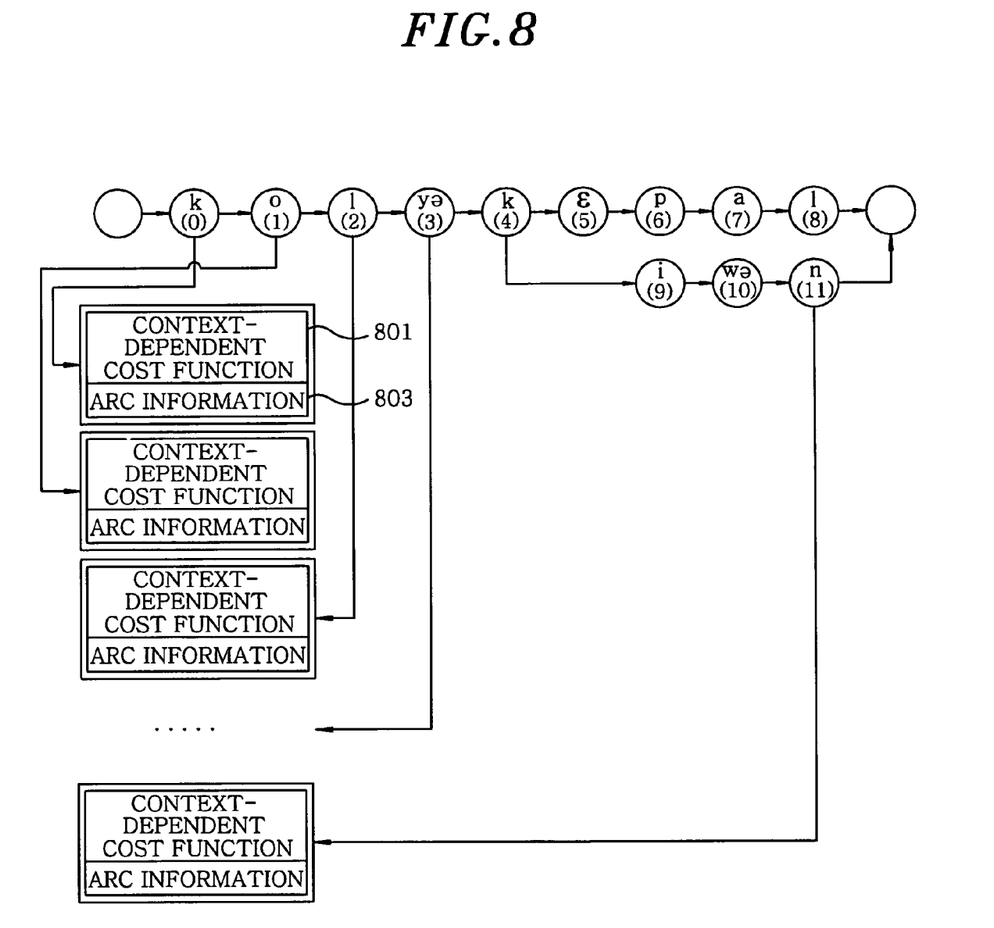
FIG. 8 depicts a specific configuration of a memory, which forms a search space during a decoding process of the pronunciation variation channel unit in accordance with the present invention.

FIG. 8 depicts a specific configuration of a memory, which forms a search space during a decoding process of the pronunciation variation channel unit 303 in accordance with the present invention.

Referring to FIG. 8, search space data to be loaded into a memory for recognizing the two Korean words "goryeogaebal" and "goryeogiwon" serving as the varied phoneme sequence received from the acoustic variation channel unit 301 is formed with context-dependent cost functions 801 and arc informations 803.

Each context-dependent cost function 801 has the same meaning as the context-dependent pronunciation variation model $P(t_i^*|c_{i+1}, c_i, c_{i-1})$ in Equation 9 and may be represented as a data structure having a form of a matrix to indicate a probability that a pronunciation variation $t_i^*$ will occur at a specific phoneme $c_i$ according to its preceding and following phonemes $c_{i-1}$, and $c_{i+1}$ next thereto in a word.

Each of the arc information 803 refers to information on a following phoneme next to a current phoneme. Because a pronunciation variation of a word is formed by connecting pronunciation variation of each phoneme forming the word, the arc information 803 includes information on how to form a word, i.e., phonemes forming a word and connecting sequence therebetween.

Consequently, the search space data is formed with matrixes representing the context-dependent cost functions 801 for all phonemes forming a word and arc information 803 representing a sequence of phonemes forming the word.

Figure 9:
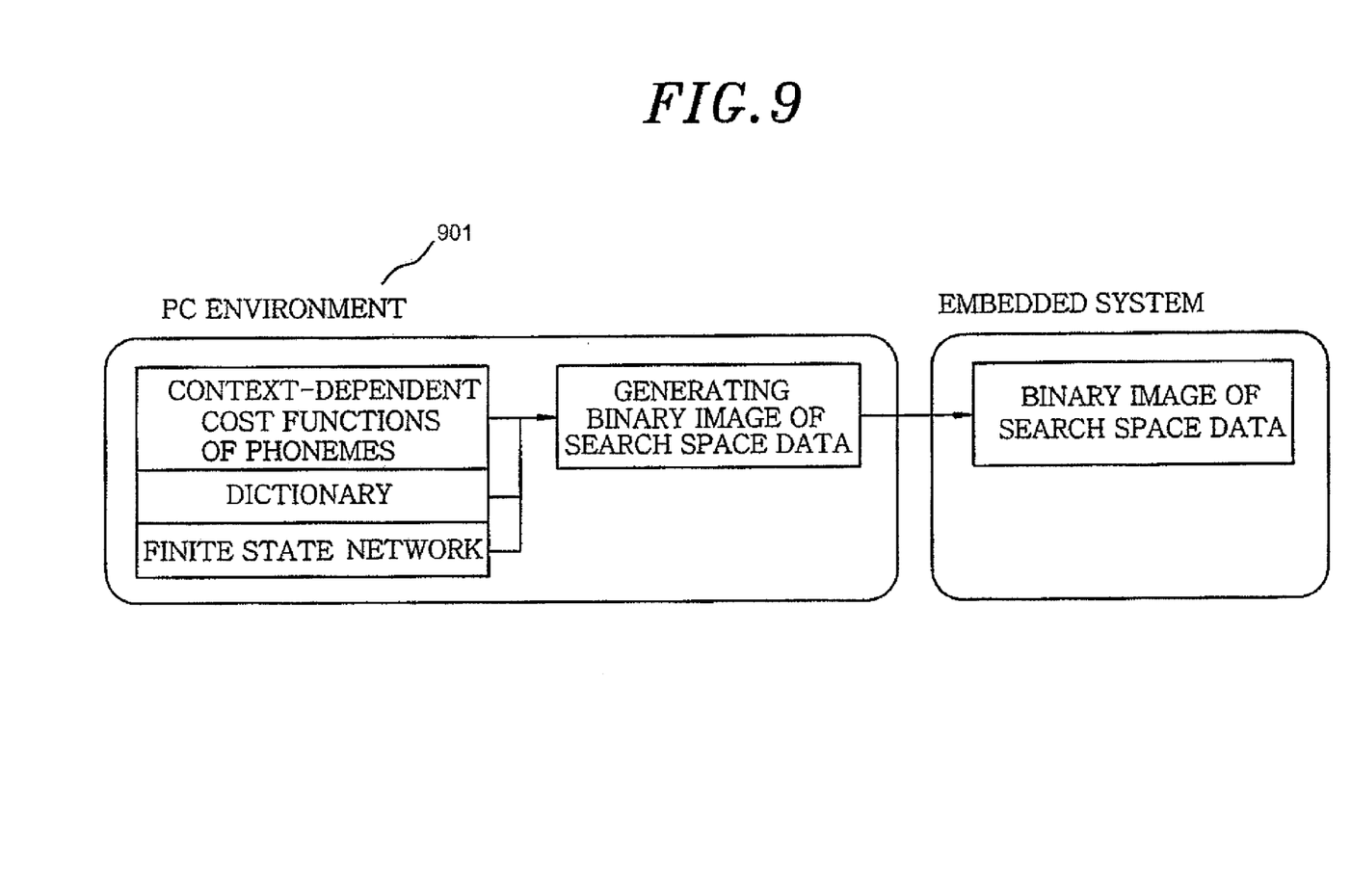
FIG. 9 shows a search space data generating process in the pronunciation variation channel unit in accordance with the present invention.

FIG. 9 shows a search space data generating process carried out in the pronunciation variation channel unit 303, shown in FIG. 3, in accordance with the present invention.

Since an embedded system in the pronunciation variation channel unit 303, shown in FIG. 3, cannot load an entire search space data into a memory, the entire search space data is formed in an external PC (Personal Computer) environment 901, and then transformed into a binary image suitable for a dynamic loading, as shown in FIG. 9.

Thereafter, the binary image is stored in the storage 3033, e.g., a ROM (Read Only Memory) or a flash memory, controlled by the embedded system in the pronunciation variation channel unit 303, and then only a necessary part of the search space data is dynamically loaded into the memory, e.g., RAM (Random Access Memory), by the Viterbi decoder 3031.

Figure 10:
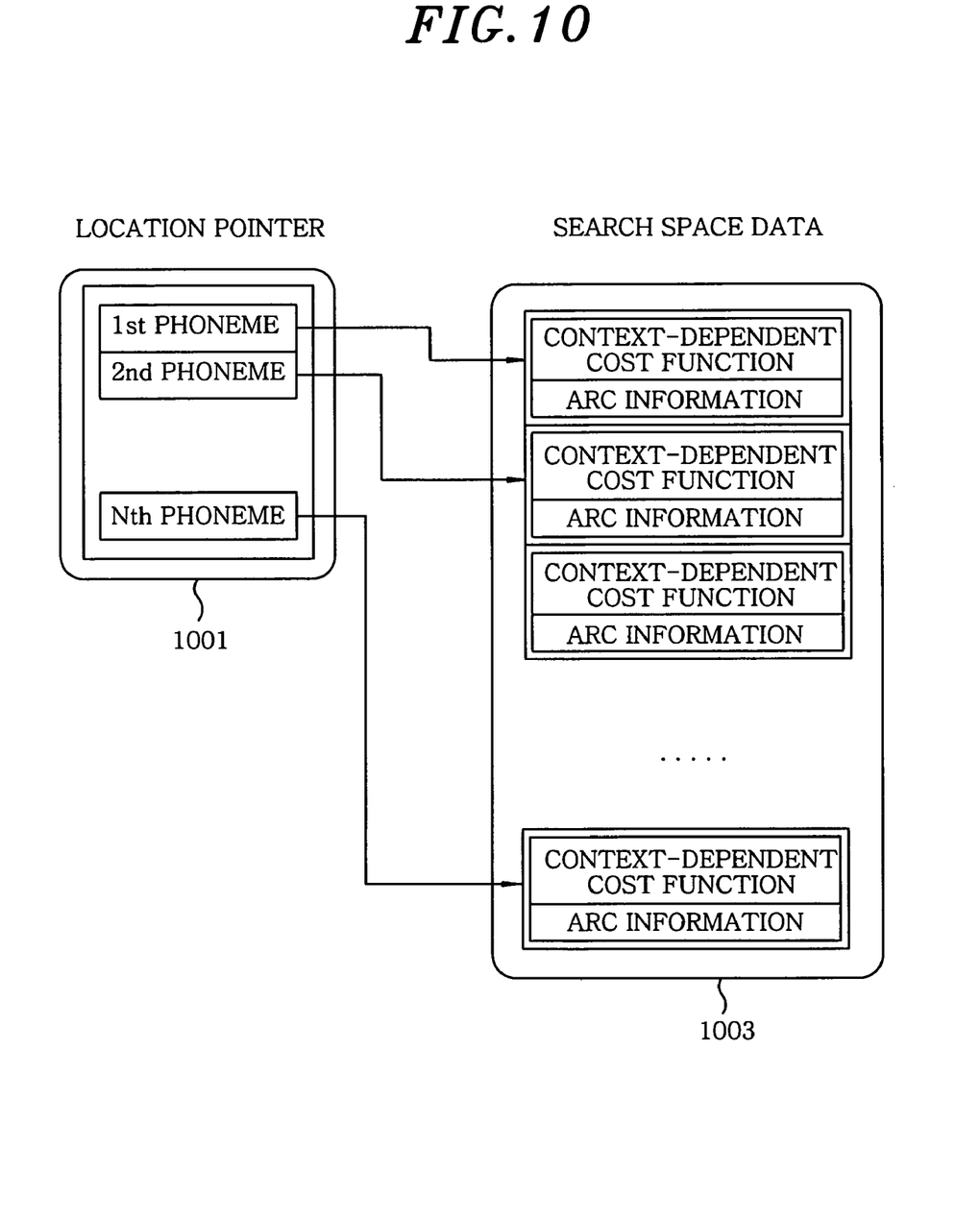
FIG. 10 presents a binary image of a search space data in accordance with the present invention.

Further, the binary image of the search space data includes a location pointer structure 1001 and a search space data structure 1003, as shown in FIG. 10, wherein the location pointer structure 1001 stores pointers each for pointing a search space data corresponding to a phoneme in the search space data structure 1003 which stores cost functions and arc information corresponding to each phoneme (1st phoneme, . . . , Nth phoneme) forming a word.

Figure 11:
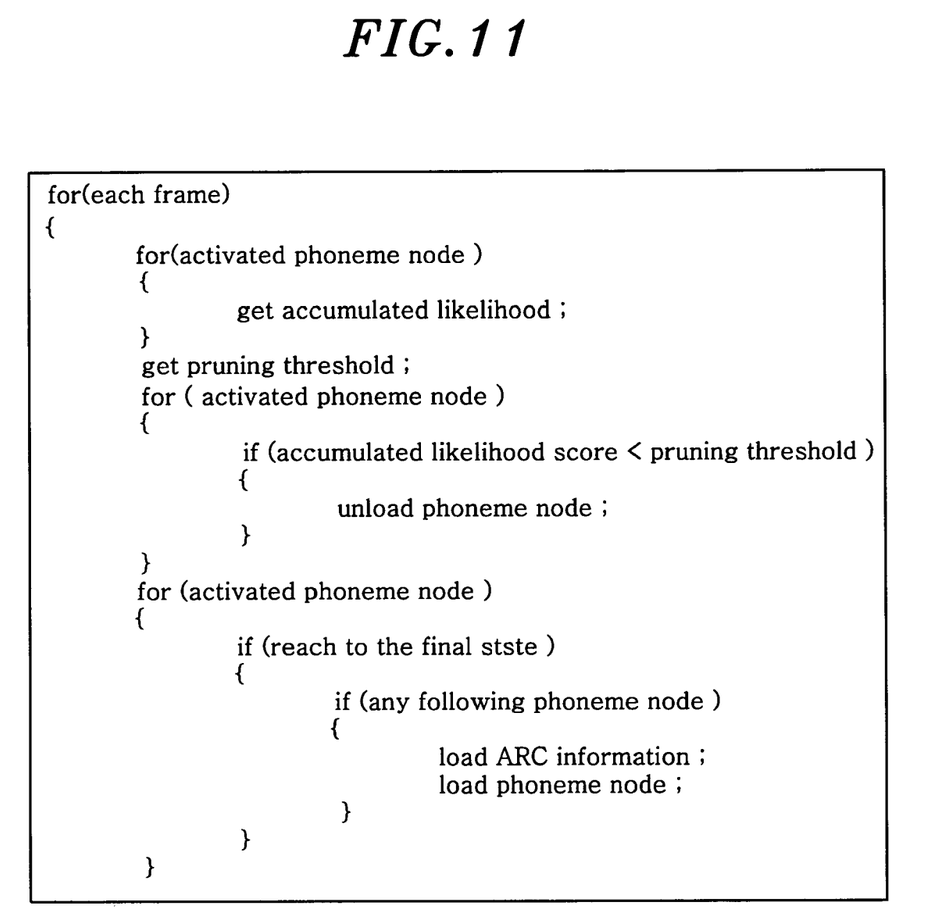
FIG. 11 shows a pseudo code for determining whether or not a search space data corresponding to the next phoneme is dynamically loaded according to a current phoneme state during a Viterbi-decoding process in accordance with the present invention.

FIG. 11 shows a pseudo code for determining whether or not a search space data corresponding to the next phoneme is dynamically loaded depending on a current phoneme state during a Viterbi-decoding process in accordance with the present invention. If the current phoneme is both activated and probable to be an optimal path, the pseudo code loads the search space data corresponding to the following phoneme next to the current phoneme into the memory in the pronunciation variation channel unit with reference to the arc information of the current node, whereas if the current phoneme is far from the optimal path, the pseudo code deactivates the current phoneme and does not load the search space data corresponding to the following phoneme next to the current phoneme.

In accordance with the present invention, the speech recognition can be performed at high speed by separately decoding two noisy channels despite an increase of with-in vocabulary, on the assumption that a speech is uttered via the two separate noisy channels (the acoustic variation channel and the pronunciation variation channel). Further, memory usage can be minimized by loading only a part necessary for operations into a memory with a dynamic loading method which predicts the necessary part from an entire search space for large vocabulary.

While the invention has been shown and described with respect to the preferred embodiments, it will be understood by those skilled in the art that various changes and modifications may be made without departing from the scope of the invention as defined in the following claims.

What is claimed is:

1. A speech recognition system for a mobile terminal, the system comprising:
   an acoustic variation channel unit for transforming a speech signal into feature parameters and Viterbi-decoding the speech signal to produce a varied phoneme sequence by using the feature parameters and predetermined models; and
   a pronunciation variation channel unit for Viterbi-decoding the varied phoneme sequence to produce a word phoneme sequence by using the varied phoneme sequence and a predetermined DHMM (Discrete Hidden Markov Model) based context-dependent error model.

2. The speech recognition system of claim 1, wherein the acoustic variation channel unit includes,
   an endpoint detector for separately detecting the speech signal from an input signal provided thereto by dividing the input signal into the speech signal and a non-speech signal;
   a feature extractor for transforming the speech signal detected by the endpoint detector into feature parameters for speech recognition;
   a storage for storing the predetermined models, wherein the predetermined models include a CHMM (Continuous Hidden Markov Model) based context-independent phoneme model, a phoneme 3-gram and a phoneme duration model; and
   a Viterbi decoder for Viterbi-decoding the speech signal to produce the varied phoneme sequence by using the predetermined models stored in the storage and the feature parameters transformed by the feature extractor.

3. The speech recognition system of claim 1 or 2, wherein the speech signal is transformed to the varied phoneme sequence by using a first decoding equation, the first decoding equation being represented by following Equation 1, $$T^* = \mathrm{argmax}_T P(T|X) \qquad \text{Equation 1}$$

wherein X indicates a vector sequence corresponding to the feature parameters of the input speech signal and T represents a phoneme sequence.

4. The speech recognition system of claim 3, wherein the varied phoneme sequence satisfies a condition that maximizes a multiplication of a prior probability and a conditional probability and is obtained by following Equation 2, Equation 2 being derived from Equation 1 by using Bayes' rule, $$\begin{aligned} T^* &= \mathrm{argmax}_T P(T|X) & \text{Equation 2}\\ &= \mathrm{argmax}_T \frac{P(X|T)P(T)}{P(X)}\\ &\approx \mathrm{argmax}_T P(X|T)P(T).\end{aligned}$$

5. The speech recognition system of claim 4, wherein the varied phoneme sequence is corrected so that deletion errors in the varied phoneme sequence are removed by following Equation 3, Equation 3 being derived from Equation 2 by applying a phoneme duration model to Equation 2, $$\begin{aligned}T^* &= \mathrm{argmax}_T P(X|T)P(T) & \text{Equation 3}\\ &= \mathrm{argmax}_T P(X|S,T)P(S|T)P(T)\end{aligned}$$

wherein P(S|T) is a phoneme duration model serving as a probability that a phoneme will occupy an input frame, which is modeled as a function of a duration and a frequency variation.

6. The speech recognition system of claim 1, wherein the pronunciation variation channel unit includes,
   a storage for storing the DHMM based context-dependent error model; and
   a Viterbi decoder for Viterbi-decoding the varied phoneme sequence to produce the word phoneme sequence by using the varied phoneme sequence Viterbi-decoded by the acoustic variation channel unit and the DHMM based context-dependent error model stored in the storage.

7. The speech recognition system of claim 1 or 6, wherein the varied phoneme sequence is transformed to the word phoneme sequence by using a second decoding equation, the second decoding equation being represented by following Equation 4, $$W^* = \mathrm{argmax}_W P(W|T^*) \qquad \text{Equation 4}$$

wherein T* indicates the varied phoneme sequence and W represents the word phoneme sequence.

8. The speech recognition system of claim 7, wherein the word phoneme sequence satisfies a condition that maximizes a multiplication of a prior probability and a conditional probability and is obtained by following Equation 5, Equation 5 being derived from Equation 4 by using Bayes' rule, $$\begin{aligned}W^* &= \mathrm{argmax}_W P(W|T^*) & \text{Equation 5}\\ &= \mathrm{argmax}_W \frac{P(T^*|W)P(W)}{P(T^*)}\\ &\approx \mathrm{argmax}_W P(T^*|W)P(W).\end{aligned}$$

9. The speech recognition system of claim 8, wherein the word phoneme sequence is obtained by using Equation 6, Equation 6 being derived from Equation 5 by using a context-dependent pronunciation variation model, $$W^* = \underset{W}{\mathrm{argmax}} P(T^*|W)P(W) \qquad \text{Equation 6}$$
$$= \underset{W}{\mathrm{argmax}} P(t_N^*, K, t_2^*, t_1^*|c_N, K, c_2, c_1)P(W)$$
$$\approx \underset{c}{\mathrm{argmax}} \prod_{i=1}^{N} P(t_i^*|c_{i+1}, c_i, c_{i-1})P(W)$$

wherein $c_i$ represents a phoneme forming the word W and $P(t_i^*|c_{i+1},c_i,c_{i-1})$ is a context-dependent pronunciation variation model of the pronunciation variation channel unit.

10. The speech recognition system of claim 9, wherein the context-dependent pronunciation variation model is modeled by using the DHMM based context-dependent error model.

11. The speech recognition system of claim 6, wherein the storage in the pronunciation variation channel unit stores a search space data therein, the search space data including a context-dependent cost function and an arc information.

12. The speech recognition system of claim 11, wherein the context-dependent cost function is represented as a data structure having a form of a matrix, the context-dependent cost function being corresponded to a probability that a pronunciation variation will occur at a phoneme depending on its preceding and following phonemes next thereto in a word.

13. The speech recognition system of claim 11, wherein the arc information is information on a following phoneme next to a current phoneme in a word, pronunciation variation of the word being formed by connecting pronunciation variation of each phoneme forming the word.

14. The speech recognition system of claim 11, wherein the search space data includes matrixes representing context-dependent cost functions for all phonemes forming a word and arc information representing a sequence of phonemes forming a word.

15. The speech recognition system of claim 14, wherein the entire search space data formed in an external device is transformed into a binary image suitable for a dynamic loading to be stored in the storage of the pronunciation variation channel unit.

16. The speech recognition system of claim 15, wherein the binary image of the search space data includes a search space data structure for storing the search space data; and a location pointer structure for storing pointers each for pointing a search space data corresponding to a phoneme in the search space data structure.

17. The speech recognition system of claim 6, wherein the Viterbi decoder of the pronunciation variation channel unit uses a pseudo code for determining whether or not a search space data corresponding to a following phoneme next to a current phoneme is dynamically loaded, depending on a state of the varied phoneme sequence received from the acoustic variation channel unit.

18. The speech recognition system of claim 17, wherein, if the current phoneme is both activated and probable to be an optimal path, the pseudo code loads the search space data corresponding to the following phoneme next to the current phoneme into a memory in the pronunciation variation channel unit with reference to the arc information of the current node, whereas if the current phoneme is far from the optimal path, the pseudo code deactivates the current phoneme and does not load the search space data corresponding to the following phoneme next to the current phoneme.

* * * * *